(12) United States Patent
Hasegawa (10) Patent No.: US 7,406,702 B2
(45) Date of Patent: Jul. 29, 2008

(54) BROADCASTING METHOD AND BROADCAST RECEIVER

(75) Inventor: Takashi Hasegawa, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 832 days.

(21) Appl. No.: 09/942,690

(22) Filed: Aug. 31, 2001

(65) Prior Publication Data

US 2002/0097879 A1    Jul. 25, 2002

(30) Foreign Application Priority Data

Jan. 22, 2001    (JP)    ............... 2001-013491

(51) Int. Cl.
*H04L 9/00*    (2006.01)
(52) U.S. Cl. ............... 725/25; 725/63; 455/26.1
(58) Field of Classification Search ............... 713/200, 713/201; 380/202, 210, 211, 228, 241, 251, 380/230, 233, 239, 242, 28–30; 725/2, 31, 725/54, 61–68, 100, 101–105, 114–118, 725/134–148, 25, 38, 86–93, 110, 151, 20; 726/2–4, 27; 709/200, 217, 219, 102, 201–203, 709/225, 310, 232; 711/100; 710/1, 5–7, 710/12, 20–21, 28, 33, 36; 348/211.3, 526; 455/39–41.3, 343.3–343.4, 26.1, 91
See application file for complete search history.

(56) References Cited

U.S. PATENT DOCUMENTS

| | | | | |
|---|---|---|---|---|
| RE33,808 E | * | 1/1992 | Wright, Jr. | ............... 725/34 |
| 5,796,828 A | * | 8/1998 | Tsukamoto et al. | ......... 380/203 |
| 6,029,045 A | | 2/2000 | Picco et al. | |
| 6,047,103 A | * | 4/2000 | Yamauchi et al. | ............. 386/94 |
| 6,052,145 A | * | 4/2000 | Macrae et al. | ............... 725/50 |
| 6,052,506 A | * | 4/2000 | Fukushima et al. | ........... 386/46 |
| 6,088,455 A | * | 7/2000 | Logan et al. | ................. 380/200 |
| 6,205,485 B1 | * | 3/2001 | Kikinis | ....................... 709/231 |
| 6,308,269 B2 | * | 10/2001 | Proidl | ........................ 713/193 |
| RE38,007 E | * | 2/2003 | Tsukamoto et al. | ......... 380/203 |
| 6,577,814 B1 | * | 6/2003 | Ito et al. | ..................... 386/125 |

(Continued)

FOREIGN PATENT DOCUMENTS

EP    0866615    9/1998

(Continued)

*Primary Examiner*—Kimyen Vu
*Assistant Examiner*—Leynna T Truvan
(74) *Attorney, Agent, or Firm*—Mattingly, Stanger, Malur & Brundidge, P.C.

(57) ABSTRACT

A broadcasting method and a broadcast receiver whereby contents are first distributed only for storage so that the stored contents are later played back in a time period predetermined by the distributing party, the contents being encrypted for protection against unauthorized reproduction in any time period other than the intended one. A content is transmitted together with a begin store command in a first time period for storage onto a storage medium at the receiving side. In a time period subsequent to the first time period, a play command is broadcast so as to retrieve the content from storage for playback. The content should preferably be encrypted. The encrypted content is decrypted and played back using a decryption key transmitted along with the play command in the second time period. The decryption key is deleted the moment the decryption process is terminated.

7 Claims, 5 Drawing Sheets

U.S. PATENT DOCUMENTS

| | | |
|---|---|---|
| 6,580,872 B1 * | 6/2003 | Kikuchi et al. ................. 386/95 |
| 6,584,552 B1 * | 6/2003 | Kuno et al. .................. 711/163 |
| 6,640,145 B2 * | 10/2003 | Hoffberg et al. .............. 700/83 |
| 6,714,649 B1 * | 3/2004 | Masuda et al. ................ 380/44 |
| 6,725,461 B1 * | 4/2004 | Dougherty et al. ............ 725/40 |
| 6,813,437 B2 * | 11/2004 | Ando et al. ................... 386/95 |
| 6,871,859 B2 * | 3/2005 | Lundblad et al. ............ 279/102 |
| 6,898,801 B1 | 5/2005 | Haraoka et al. |
| 6,941,383 B1 * | 9/2005 | Getsin et al. ................ 709/248 |
| 6,965,593 B2 * | 11/2005 | Donahue et al. ............ 370/352 |
| 7,055,166 B1 * | 5/2006 | Logan et al. ................. 725/32 |
| 2006/0078296 A1 | 4/2006 | Takao |

FOREIGN PATENT DOCUMENTS

| | | |
|---|---|---|
| EP | 1032147 | 8/2000 |
| JP | 02-223252 | 9/1990 |
| JP | 09-008753 | 1/1997 |
| JP | 10-079924 | 3/1998 |
| JP | 11-213553 | 8/1999 |
| JP | 2000-174715 | 6/2000 |
| JP | 2000-244425 | 9/2000 |
| JP | 2000-358217 | 12/2000 |
| WO | 99/59335 | 11/1999 |

* cited by examiner

BROADCASTING METHOD AND BROADCAST RECEIVER

BACKGROUND OF THE INVENTION

The present invention relates to a method for broadcasting contents such as visual images and audio sounds, as well as to a receiver for receiving the contents broadcast by that method.

Contents such as visual images and audio sounds (i.e., net information excluding added data), to be telecast or transmitted by radio conventionally over such media as cables or radio waves, are broadcast and received simultaneously. In that setup, when to broadcast programs is determined solely by the transmitting side, and the media band width is monopolized by the contents being transmitted. If any contents are desired to be broadcast a plurality of times, the entire contents must be transmitted as many times.

If the contents are visual images that are digitally compressed, they still require a broad bandwidth for transmission. One way to ease the monopoly of the media by transmission of such huge data involves having digitally compressed and encrypted contents stored on a suitable storage medium (e.g., DVD) that may be distributed illustratively by mail while broadcasting only a decryption key for eventual decryption of the contents (as proposed by Japanese Published Unexamined Patent Application, publication No. 11-213553). The decryption key may be acquired by subscribers only.

The proposed way of distributing contents requires that users as subscribers receive both encrypted contents and a decryption key to decrypt the received contents. The users may play back the contents whenever they want and however they want it. Unlike conventional broadcasting, the contents in general are not reproduced by the receiving side at any specific time dictated by the broadcasting side.

To simultaneously broadcast and receive contents requires securing a broad band width for transmission, as mentioned above. Meanwhile, digitizing contents makes it possible for the distributing party to adopt, besides the above-described use of storage media, various rational means of distribution such as dividing the contents into a plurality of narrow band widths for transmission, and transmitting the contents on a narrow band width over an extended period of time. In such cases, simultaneity is lost. Still, the distributing party (i.e., the broadcaster) has numerous contents that the broadcaster wants to be received at predetermined times by the receiving side. Conventional techniques have so far been incapable of embracing such rational means of distributing contents while meeting the requirement for the contents to be viewed and/or heard in any intended time.

Where the same contents are to be broadcast a number of times, it may be desirable to transmit the contents only once before their repeated, predetermined playback so that they may utilize a broad band width as efficiently as possible. However, broadcasting arrangements offering these features have yet to be implemented by conventional techniques.

SUMMARY OF THE INVENTION

It is therefore a first object of the present invention to overcome the above and other deficiencies of the prior art and to provide a broadcasting method and a broadcast receiver whereby contents are broadcast and received without being viewed on the spot by the receiving side, so that the broadcast contents are later viewed at a time predetermined by the broadcasting side.

It is a second object of the present invention to provide a broadcasting method and a broadcast receiver whereby broadcast contents are protected against being viewed at any time other than the predetermined time by the broadcasting side.

The first object may be achieved according to one aspect of the present invention, which provides a broadcasting method comprising the steps of: broadcasting contents along with a begin store command in a first time period, the begin store command causing the contents to be stored onto a storage medium at a receiving side; and broadcasting a play command in a second time period subsequent to the first time period, the play command causing the contents stored on the storage medium to be retrieved therefrom for audio and visual playback.

According to another aspect of the invention, there is provided a broadcast receiver comprising: a receiver for receiving contents broadcast in a first time period along with a begin store command causing the contents to be stored, and a play command broadcast in a second time period subsequent to the first time period, the play command causing the stored contents to be retrieved for playback; a storage medium for storing the contents received; and a processor for storing the contents onto the storage medium in accordance with the received begin store command and for retrieving the contents from the storage medium for playback in accordance with the received play command.

The second object may be achieved by preferably implementing a broadcast receiver wherein the contents broadcast in the first time period may be encrypted, wherein the play command broadcast in the second time period may include a decryption key for decrypting the encrypted contents, and wherein the processor may retrieve the encrypted contents from the storage medium and decrypt the retrieved contents for playback. In the preferred setup, the processor may further store the received decryption key into a memory and delete the decryption key from the memory after decrypting the encrypted contents using the decryption key.

These and other objects, features and advantages of the present invention will become more apparent in view of the following detailed description of the preferred embodiments in conjunction with accompanying drawings.

DESCRIPTION OF THE PREFERRED EMBODIMENTS

Preferred embodiments of this invention will now be described in detail with reference to the accompanying drawings.

Figure 1:
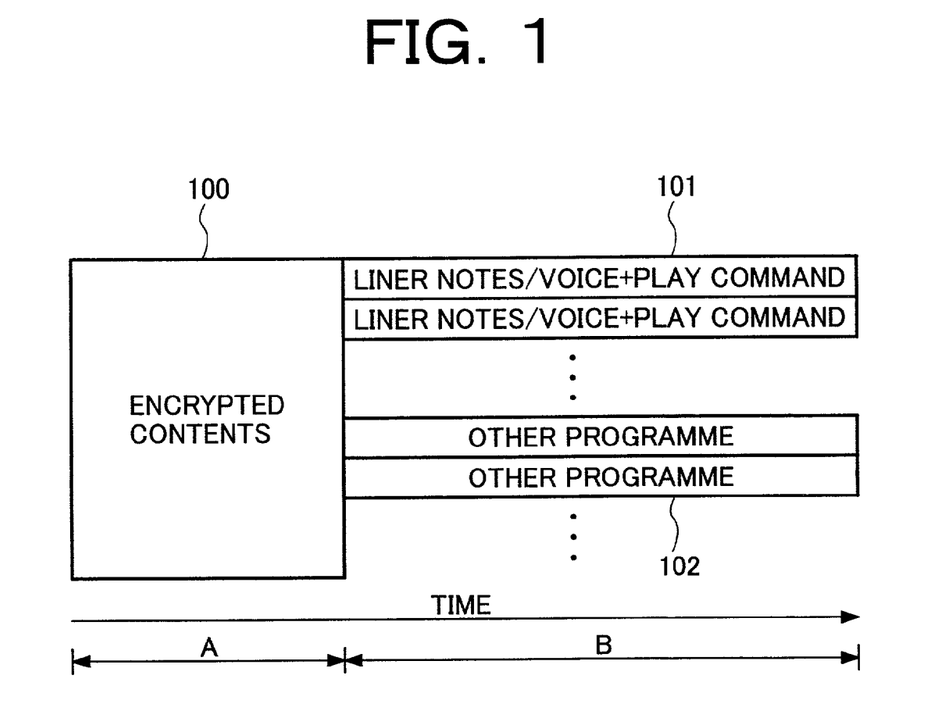
FIG. 1 is a schematic view explaining a broadcasting method embodying the invention.

Illustratively, satellite broadcasting is implemented in a setup where most of the available channel band width is allocated to a telecast and the rest of the band width is used to permit a plurality of data broadcasts. In that setup, the remaining band width is further divided into parts for the multiple broadcasts, so that each band width part is significantly narrow. Such a narrow band width, however, is sufficient for each data transmission. FIG. 1 outlines a broadcasting method embodying the invention in a way suitable for data broadcasts of the above type.

In FIG. 1, reference character A denotes a time period ranging from midnight to early morning, in which normal programming is not in effect because of a small number of expected viewers; and reference character B represents a time period in which normal programming is in force during the day from morning till evening. In this embodiment, at least one encrypted content 100 is transmitted in the time period A using all band widths that would otherwise be allocated to a plurality of data broadcasts. Later in the time period B, liner notes and voice commentaries are broadcast together with play commands as sub data 101 on the content 100. A decryption key for decrypting the encrypted content 100 is broadcast as included in each play command. In the time period B, data 102 constituting other broadcasts are transmitted over their respective channels.

In the time period A, the encrypted content 100 is received by a constantly operating receiver and stored on a storage medium at the receiving side. The stored content 100 is retrieved in accordance with each play command in the sub data 101 broadcast in a subsequent time period. The retrieved content 100 is played back while being decrypted.

The time at which to broadcast the sub data 101 on the content 100 is predetermined by the distributing party (broadcasting side). That means the content 100 is played back by the receiving side only at the time designated beforehand by the distributing party. At any other time, the encrypted content 100 is protected against unauthorized decryption and playback because play commands are not distributed.

It is possible to broadcast the play command as part of the sub data 101 a plurality of times in the time period B. This allows the content 100 to be played back as many times using the broadcast play commands. That is, the content is broadcast only once while the distributed content may later be played back as many time as designated.

Below is a detailed description in sequence of how contents are typically distributed and received.

Figure 2:
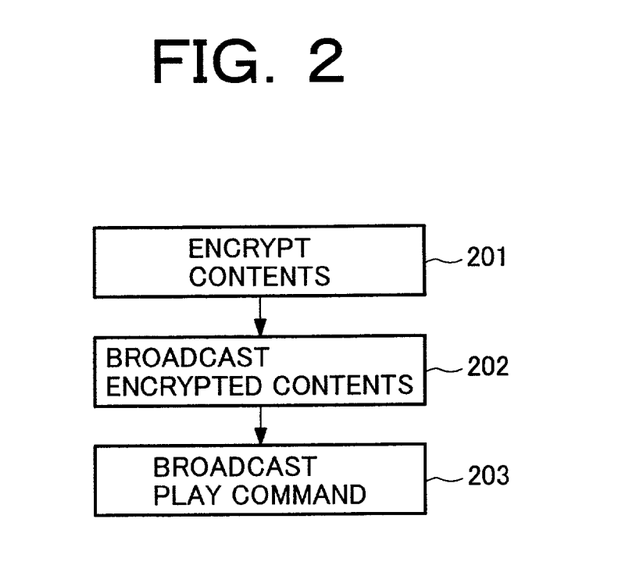
FIG. 2 is a flowchart of steps constituting the inventive broadcasting method for content distribution.

FIG. 2 is a flowchart of steps constituting the broadcasting method embodying the invention. Contents 100 are first encrypted (in step 201), and the encrypted contents 100 are transmitted in the time period A preceding an intended time for playback (in step 202). When the playback time predetermined by the distributing party is reached in the time period B, sub data 101 on the contents 100, i.e., liner notes, voice commentaries and play commands about the contents, are broadcast (in step 203).

The contents 100 are encrypted in step 201 using a different encryption key for each content. For example, a content Ci is encrypted by use of an encryption key KEi unique to the content Ci. That encryption process generates an encrypted content KEi(Ci).

Figure 3:
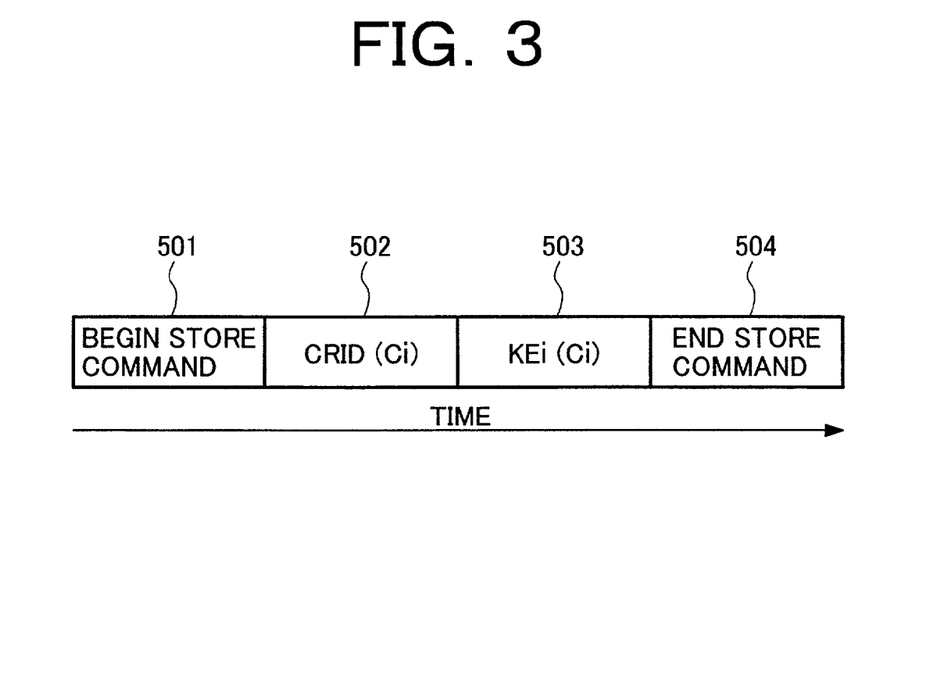
FIG. 3 is a schematic view detailing the step of transmitting encrypted contents as shown in FIG. 2.

FIG. 3 is a schematic view detailing broadcast of a content 100 in the time period A. The broadcasting side first sends a begin store command 501 causing the constantly operating receiver to store the content onto a storage medium. Transmission of the begin store command 501 is followed by CRID(Ci) as an identifier uniquely identifying the content to follow. The identifier CRID(Ci) is then followed by an encrypted content KEi (Ci). At the end of the content, the transmitting side sends an end store command 504 to terminate broadcast of the content.

Figure 4:
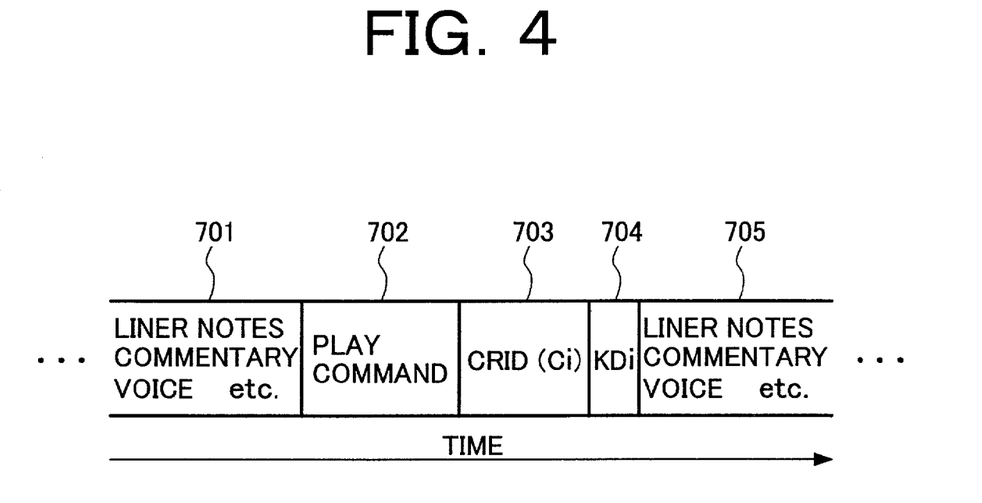
FIG. 4 is a schematic view detailing the step of transmitting a play command as shown in FIG. 2.

FIG. 4 is a schematic view explaining details of sub data 100 on the content 100 to be distributed in the subsequent time period B and at a time predetermined by the distributing party. The transmitting side first sends data 701 other than a content, such as liner notes and voice commentaries on the content KEi(Ci). The data 701 are followed by a play command 702 causing the encrypted content KEi(Ci) to be played back from the storage medium by the constantly operating receiver. The play command 702 is followed by CRID (Ci) 703 as an identifier uniquely identifying the content to follow. The identifier 703 is followed by a decryption key KDi 704 allowing the encrypted content to be decrypted. The decryption key KDi 704 is then followed by data 705 about another content 100 but other than the content, such as liner notes and voice commentaries. The data 705 are in turn followed by another play command, and so on.

Figure 5:
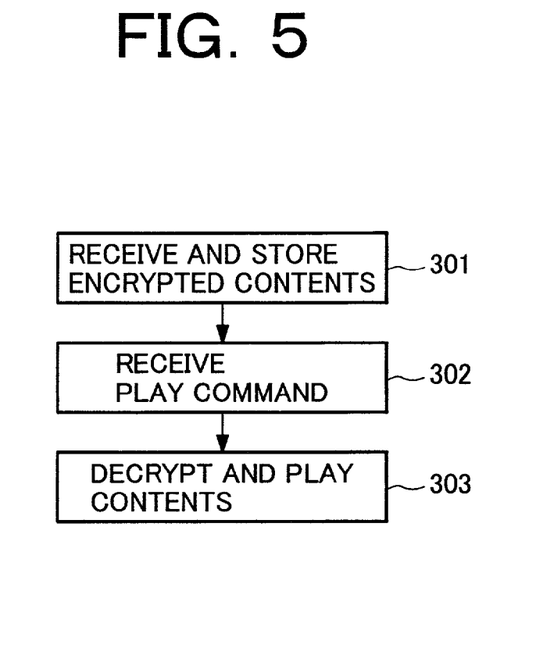
FIG. 5 is a flowchart of steps outlining how a broadcast receiver of this invention works.

FIG. 5 is a flowchart of steps performed by the receiving side receiving what has been transmitted as described above by the transmitting side. It is assumed that the receiver is constantly in operation. In the time period A, the encrypted content 100 is received and stored (in step 301). At a predetermined time in the time period B subsequent to the time period A, a play command is received (in step 302). The play command causes the content 100 to be decrypted and played back at the same time (in step 303).

Figure 6:
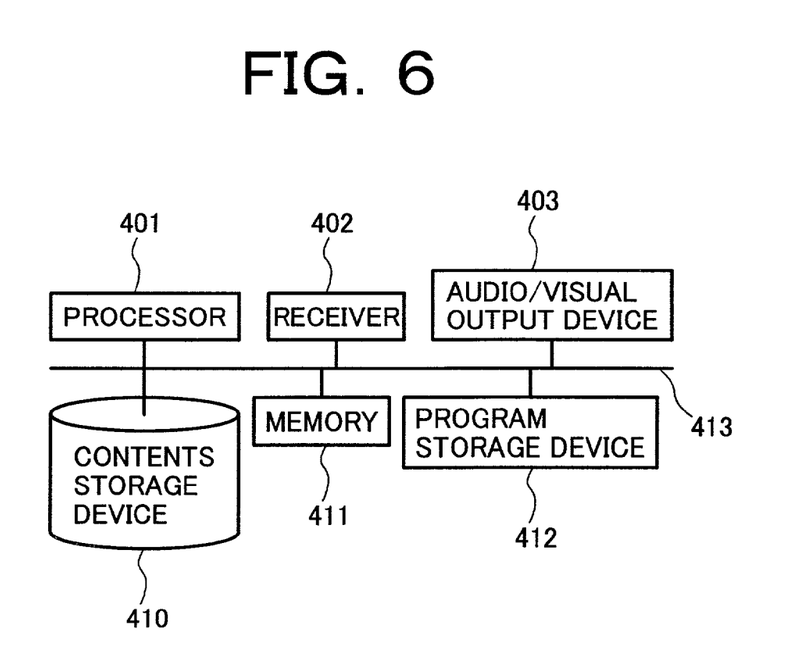
FIG. 6 is a block diagram of a typical broadcast receiver embodying this invention.

FIG. 6 is a block diagram of a typical broadcast receiver that carries out the receiving steps described above. The receiver comprises: a processor 401 that performs decryption of contents and other processes; a receiver 402 that inputs liner nodes, voice commentaries and play commands; an audio visual output device 403 that outputs contents, liner nodes and voice commentaries; a content storage device 410 that stores contents; a memory 411 that temporarily holds received play commands and other data; a program storage device 412 that stores programs and data other than contents and play commands; and a bus 413 that interconnects these component devices.

The receiver 402 is a satellite broadcasting receiver. However, this invention is not limited to satellite broadcasting but may be applied to various broadcasting systems such as terrestrial broadcasting, communication satellite broadcasting, and CATV. In keeping with any of such setups that may be adopted, a terrestrial broadcasting receiver, a communication satellite receiver or a set-top box may be utilized.

The audio visual output device 403 is made up of an amplifier and speakers if the content is composed only of audio data. The output device 403 may further include a monitor or other suitable display unit if the content is made up of visual data.

The content storage device 410 may be any one of such devices as a hard disc drive (magnetic disk drive), a DVD-RAM/RW drive and a flash memory. The memory 411 is typically implemented in the form of a DRAM. The program storage device 412 may be any one of such devices as a hard disc drive, a flash memory and a ROM.

Figure 7:
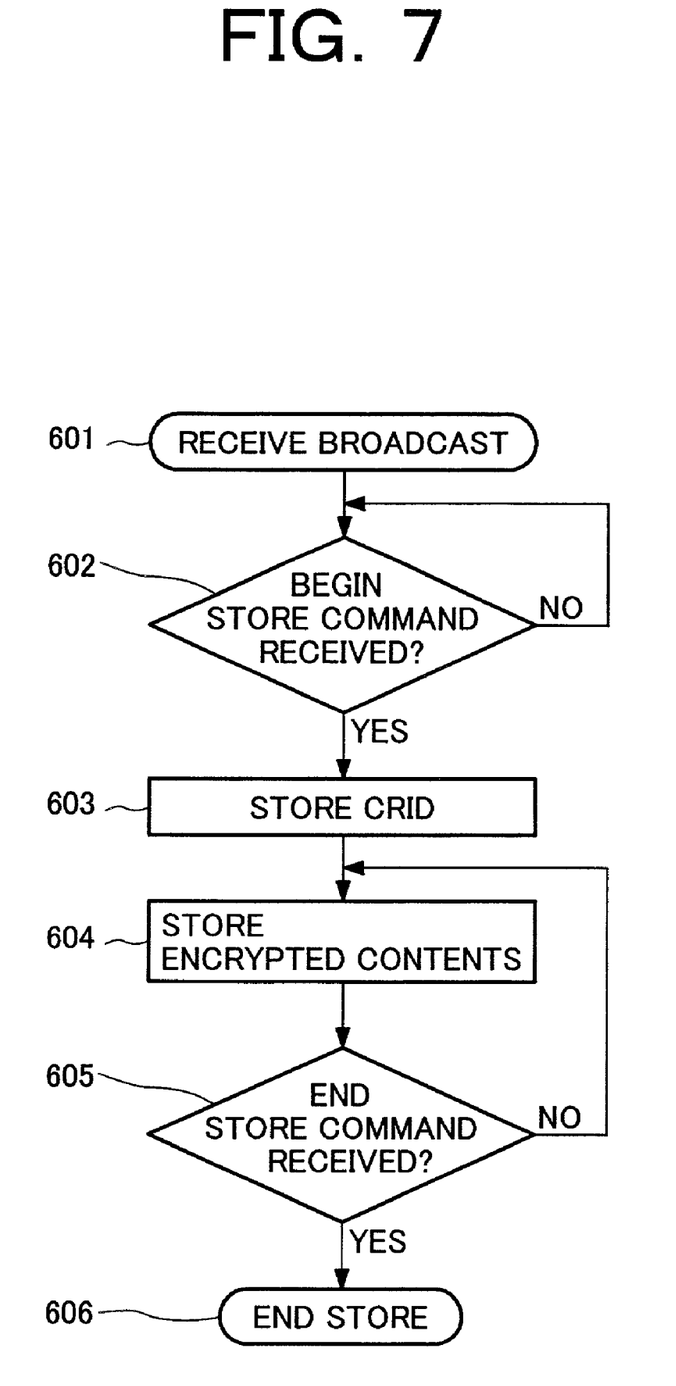
FIG. 7 is a flowchart of steps explaining how encrypted contents are received and stored by the broadcast receiver shown in FIG. 6.

The process in step 301 of receiving and storing the encrypted content, shown in FIG. 5, will now be described in more detail by referring to FIG. 7. It is assumed that the receiver is constantly in operation and that the receiver 402 is receiving broadcasts (in step 601). The processor 401 processes the received information in a manner described below in accordance with programs stored in the program storage device 412. If the received information is not a begin store command 501, the processor 401 waits for the command to arrive (in step 602). Upon receipt of the begin store command 501, the processor 401 stores an identifier CRID(Ci) 502 following the command 501 onto the content storage device 410 (in step 603).

An encrypted content KEi(Ci) 503 received following the identifier 502 is then stored onto the content storage device 410 (in step 604). At this point, the correspondence between the identifier CRID(Ci) and the content KEi(Ci), which will be needed later in decrypting and playing back the content, is determined by this embodiment establishing CRID(Ci) as the name of a file in which to store KEi(Ci). That is, the identifier CRID(Ci) is stored as directory information on the content storage device 410.

The encrypted content KEi(Ci) is stored continuously until an end store command 504 is received (in step 605). Upon receipt of the end store command 504, the processor terminates the process of receiving and storing the encrypted content 100 (in step 606).

Figure 8:
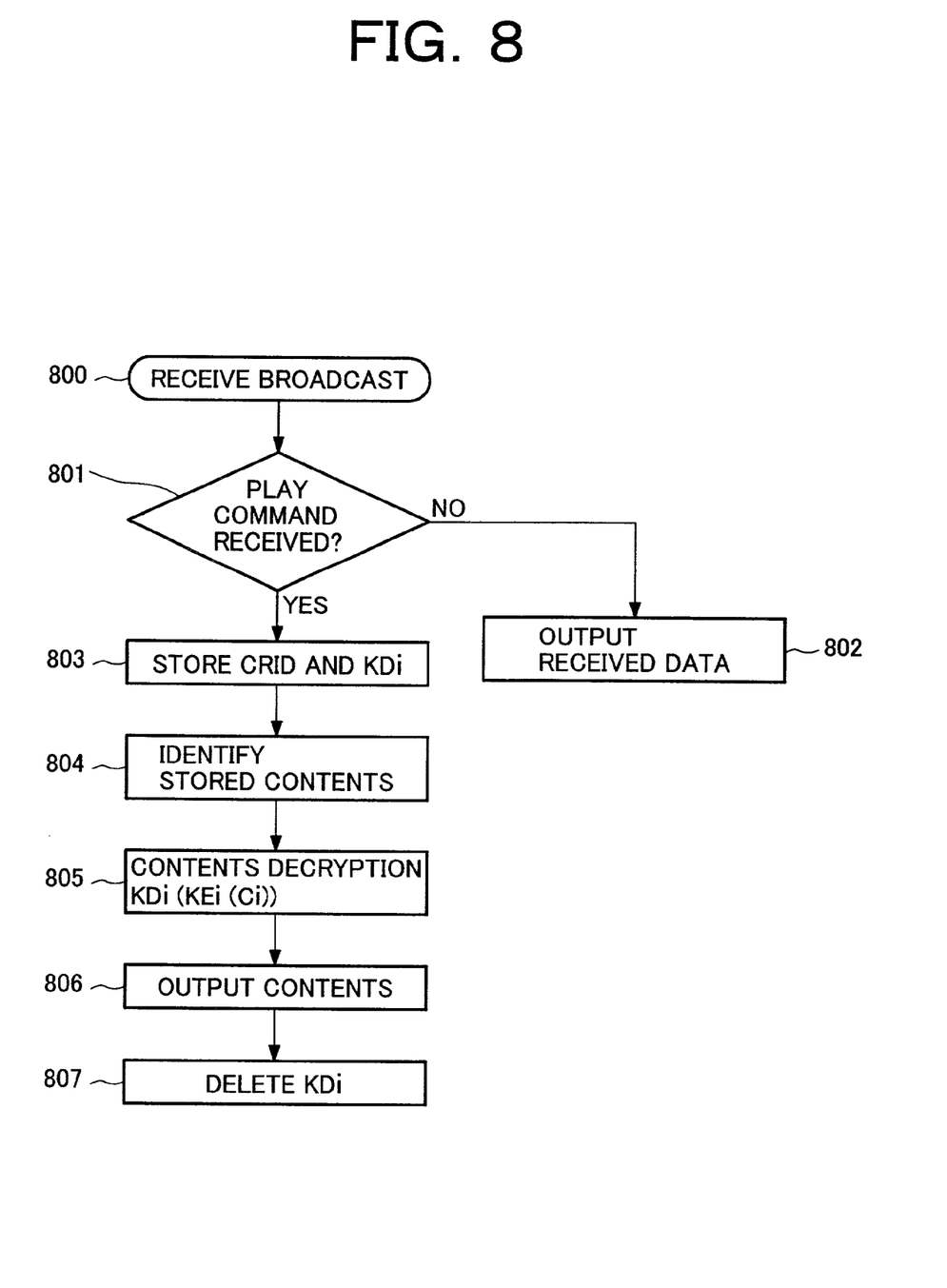
FIG. 8 is a flowchart of steps explaining how a play command is received and how the corresponding encrypted content is decrypted and played back by the broadcast receiver of FIG. 6.

The process in step 302 of receiving a play command and the process in step 303 of decrypting and playing back the encrypted content, shown in FIG. 5, will now be described in more detail by referring to FIG. 8. It is assumed that the receiver is constantly in operation and that the receiver 402 is receiving broadcast information (in step 800). The processor 401 processes the received information in a manner described below in accordance with programs stored in the program storage device 412. If the received information is not a play command 702 (in step 801), the processor sends out the information without performing any additional processing. The information in this case is made up of liner notes and voice commentaries on the content 100. If the received information turns out to be a play command 702, the processor stores into the memory 411 an identifier CRID(Ci) 703 and a decryption key 704 transmitted following the command 702 (in step 803).

Based on the identifier CRID(Ci) 703, the processor identifies and retrieves the encrypted content from the content storage device 410 (in step 804). With this embodiment, the file having a file name of CRID(Ci) 703 is an encrypted content file. The processor then decrypts the encrypted content using the decryption key KDi 704 held in the memory (in step 805) and outputs the decrypted content to the audio visual output device 403 (in step 806). After the output, the processor deletes the decryption KDi 704 from the memory (in step 807).

Where the processing above is performed, the receiver has only the encrypted content 100 retained therein at any time except at a predetermined playback time, whereby the content is protected against unauthorized decryption and reproduction. For playback, a play command, an identifier CRID(Ci) 703 and a decryption key KDi 704 need only be broadcast. That means a narrow band width is sufficient for the purpose.

After viewing a content, a user may want to purchase that content. In that case, the user may buy only the decryption key KDi 704 over a suitable network.

Although the embodiment above has been described as distributing contents by utilizing all band widths dedicated to data broadcasts, this is not limitative of the invention. If the contents to be sent are not large enough in data size to occupy the entire band widths, only those band widths commensurate with the data size may be employed. The invention is not limited to using data broadcasts; it may also be implemented by utilizing spare time periods in TV and radio broadcasts.

As described and according to the invention, an encrypted content is transmitted in a time period such as midnight when ordinary broadcast contents are not distributed, so that the encrypted content is stored and later decrypted for playback by subsequent transmission of text information of a limited data size, a play command, an identifier for identifying the content in question, and a decryption key. This method allows contents to be broadcast using a narrow band width and played back in a sequence and in a manner predetermined by the distributing party.

Where the same content such as a commercial is to be broadcast a number of times during a given broadcast time period, the content need only be broadcast once for storage, followed by a play command, a content identifier and a decryption key transmitted as many times as desired.

Because the decryption key is transmitted exactly when the content corresponding to the key is to be played back from storage and because the key is deleted the moment the playback is terminated, the content is enjoyed only during the time period predetermined by the distributing party and not in any other time period. This feature protects contents against unauthorized decryption and playback.

If users wishes to purchase a content, they need only buy in a suitable manner a decryption key corresponding to the content in question.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A broadcasting method comprising the steps of:
   broadcasting encrypted contents from a broadcasting side wherein said encrypted contents are encrypted by said broadcasting side and said encrypted contents are stored into a storage medium at a receiving side; and
   broadcasting a play command with a decryption key at the time after broadcasting said encrypted contents to cause the encrypted contents to be played, wherein the time at which the play command and decryption key are broadcast is predetermined by said broadcasting side and said decryption key is stored into a memory at a receiving side;
   wherein, upon receiving said play command, the receiving side causes said encrypted contents to be retrieved from said storage medium and said decrypted using said decryption key to produce decrypted contents, and wherein the decrypted contents are outputted and said decryption key is deleted from said memory when output of said decrypted content is finished,
   wherein said encrypted contents are broadcasted with a first identifier identifying said encrypted contents, and
   wherein said play command broadcasted with a second identifier identifying said first identifier to indicate that said encrypted contents, broadcast with the first identifier, are to be retrieved from said storage medium for output.

2. The broadcasting method according to claim 1, wherein said encrypted contents broadcast in a first time period include an end store command for terminating the storing of said contents into said storage medium.

3. A broadcasting receiver comprising:
   a receiving unit which receives encrypted contents, which is encrypted by a broadcasting side, broadcasting from the broadcasting side, and receives a play command with a decryption key at the time after broadcasting said encrypted contents to cause the encrypted contents to be played, wherein the time at which the play command and decryption key are broadcast is predetermined by said broadcasting side;
   a storage medium which stores said encrypted contents;

a memory which stores said decryption key;

a processor which stores said encrypted contents into said storage medium, stores said decryption key into said memory, retrieves said encrypted contents from said storage medium in accordance with said play command, decrypts said encrypted contents by using said decryption key stored in said memory for output to produce decrypted contents and deletes said decryption key from said memory when output of the decrypted contents is finished, wherein said encrypted contents are broadcasted with a first identifier identifying said encrypted contents, and wherein said play command broadcasted with a second identifier identifying said first identifier to indicate that said encrypted contents, broadcast with the first identifier, are to be retrieved from said storage medium for output.

4. The broadcast receiver according to claim 3, wherein said encrypted contents broadcast in a first time period include an end store command for terminating the storing of said contents into said storage medium.

5. The broadcast receiver according to claim 4, wherein the processor terminates the storing of said encrypted contents into said storage medium the moment said end store command is received.

6. The broadcast receiver according to claim 4, wherein the processor finds a stored start command and stores said encrypted contents into said subsequent to said store start command.

7. The broadcast receiver according to claim 3, wherein the processor finds a stored start command and stores said encrypted contents into said subsequent to said store start command.

* * * * *